United States Patent
Mishra et al.

(10) Patent No.: US 11,963,188 B2
(45) Date of Patent: Apr. 16, 2024

(54) SYSTEM AND METHOD FOR BEAM TRACKING IN A 5G NEW RADIO MMWAVE USER EQUIPMENT

(71) Applicant: Samsung Electronics Co., Ltd., Suwon-si (KR)

(72) Inventors: Samir Kumar Mishra, Bengaluru (IN); Digvijay Katyal, Bengaluru (IN); Prince Arya, Bengaluru (IN); Sarvesha Anegundi Ganapathi, Bengaluru (IN); Alok Jain, Bengaluru (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 136 days.

(21) Appl. No.: 17/479,456

(22) Filed: Sep. 20, 2021

(65) Prior Publication Data
US 2022/0095356 A1 Mar. 24, 2022

(30) Foreign Application Priority Data

Sep. 21, 2020 (IN) .............................. 202041040828
Sep. 15, 2021 (IN) .............................. 202041040828

(51) Int. Cl.
*H04B 7/08* (2006.01)
*H04W 72/23* (2023.01)

(52) U.S. Cl.
CPC ............ *H04W 72/23* (2023.01); *H04B 7/088* (2013.01)

(58) Field of Classification Search
CPC .............................. H04W 72/23; H04B 7/088
See application file for complete search history.

(56) References Cited

U.S. PATENT DOCUMENTS

| | | | |
|---|---|---|---|
| 11,050,478 B2 | 6/2021 | Guo et al. | |
| 2016/0150435 A1* | 5/2016 | Baek | H04B 7/0608 370/252 |
| 2019/0082332 A1* | 3/2019 | Raghavan | H04B 7/0695 |
| 2019/0238210 A1* | 8/2019 | Tang | H04B 17/318 |
| 2019/0261202 A1* | 8/2019 | Tang | H04W 76/10 |
| 2020/0403689 A1* | 12/2020 | Rofougaran | H04W 52/245 |
| 2021/0111779 A1* | 4/2021 | Kundargi | H04W 80/02 |
| 2021/0136734 A1* | 5/2021 | Nam | H04L 5/0094 |
| 2022/0078726 A1* | 3/2022 | Zhu | H04W 24/10 |
| 2022/0078735 A1* | 3/2022 | Saggar | H04B 7/0695 |
| 2023/0198640 A1* | 6/2023 | Kovács | H04B 17/26 370/252 |

FOREIGN PATENT DOCUMENTS

WO WO-2018-147665 A1 8/2018

* cited by examiner

*Primary Examiner* — Chi Ho A Lee
*Assistant Examiner* — Andrew Lee
(74) *Attorney, Agent, or Firm* — Harness, Dickey & Pierce, P.L.C.

(57) ABSTRACT

A method is provided for beam tracking in a user equipment (UE), the UE configured to communicate using mmWave in a 5G New Radio (NR) network, the method includes selecting a first beam among a plurality of beams based on a predicted reference signal, perform adaptive filtering on the first beam, and tracking statistical variations in the first beam based on the adaptive filtering.

20 Claims, 6 Drawing Sheets modeling a beam tracking target as a dynamically selected target by selecting beam based on a predicted reference signal — 202 moderating the decision of dynamically selected beam based on the predicted signal by appropriating adaptive filtering for selecting the beam — 204 tracking statistical variations in each selected beam as a part of the adaptive filtering. — 206

SYSTEM AND METHOD FOR BEAM TRACKING IN A 5G NEW RADIO MMWAVE USER EQUIPMENT

CROSS-REFERENCE TO RELATED APPLICATION

This application claims priority from Indian Provisional Patent Application No. 202041040828 filed on Sep. 21, 2020 and Indian Complete Patent Application No. 202041040828 filed on Sep. 15, 2021, in the Indian Intellectual Property Office and all the benefits accruing therefrom under 35 U.S.C. § 119, the contents of which in its entirety are herein incorporated by reference.

TECHNICAL FIELD

Embodiments generally relate to wireless communication, and more particularly relates to, systems and methods for beam tracking in a $5^{th}$ Generation (5G) New Radio (NR) mmWave User Equipment (UE).

BACKGROUND

Millimeter (mmWave) frequencies are being utilized in Next Generation wireless systems as one of the key avenues to meet the ever-increasing demands for higher bandwidth. At such high frequencies, channel impairments like diffraction loss, high path loss, etc. are also significant. Beam Management techniques are thus important to make the most out of mmWave advantages. One such technique is Beam Tracking.

Beam tracking is important due to mobility of the UE and the changes in environment. It is desirable for the UE to keep track of which beam should be used for receiving a certain reference signal. UE should continuously sweep its Rx beams for a reference signal (serving Synchronization Signal Block (SSB)) and maintain the best (e.g., strongest signal) Rx Beam corresponding to it.

Limitations of current beam tracking schemes include intensive calculations involved in sparse optimization problems that might not be suitable for implementation especially at UE side. Use of prior beam direction may narrow down the search space for efficient tracking but these methods do not fully capture the true channel dynamics. A number of current beam tracking schemes include:

Round Robin based beam tracking—In this approach, continuous beam sweeping is performed by all beams in round robin manner to select the one with best RSRP for serving SSB. Example: S0 is the reference signal for the UE and UE side beams are B0~B6 with B3 as currently best beam for S0. Beam Tracking Sequence: B3→B0→B3→B1→B3→B2→ . . . .

Look-up Table (LUT) based beam tracking: In this approach, a complicated decision logic is avoided by means of a pre-computed table. For a given beam, the neighboring beams may be provided in order of their proximity to the beam in form of a LUT. This helps to track the changes in mobile environment more effectively as compared to Round Robin scheme. Beam Tracking Sequence: B3→B4→B3→B5→B3→B6→ . . . .

The following are generic points in which beam forming works in existing technology (5G)

The network uses specific different downlink beams to send SSBs in a particular direction.

Analog beams are used in UE. By using analog beam, a UE may look for arrival of signal only in one direction at a time.

In a dynamic environment, it is desirable for the UE to keep a track of direction of arrival of SSB so that UE is continuously synchronized to network and data transfer is possible Received Signal Received Power (RSRP) and Signal-to-Interference-plus-Noise Ratio (SINR) as parameter to find best direction of arrival is also known.

Round robin and LUT based methods are known in literature. The main limitation of both methods is the time taken to measure the RSRP (or any parameter signifying the signal strength) on each combination of SSB (transmission (Tx) beam—reception (Rx) beam) and to report. This will delay the measurement reports and hence, UE may not track the beam effectively resulting in loss of connection in worst scenarios.

It would be desirable to provide a solution to overcome the above-mentioned drawback.

SUMMARY

This summary is provided to introduce a selection of concepts, in a simplified format, that are further described in the detailed description of embodiments. This summary is neither intended to identify key or essential inventive concepts and nor is it intended for determining the scope of embodiments.

The present subject matter relates to a method for beam tracking in a 5G New Radio (NR) mmWave UE. In embodiments, the method includes modeling the beam tracking problem as a dynamic choice selection problem, such that the selection is based on predicted Reference Signal Received Power (RSRP). The method includes combining dynamic choice selection problem with adaptive filtering. Further, the dynamic choice selection helps to select the optimal or desired choice most of the time. Adaptive filtering enables tracking of variations in mean and variance of each choice. Further, one tuning parameter is used for the algorithm (e.g., the algorithm may be performed using only one tuning parameter, for example, the RSRP).

In embodiments, the present subject matter refers a method for beam tracking in a 5G network (5G New Radio (NR) mmWave UE). The method comprises modeling a beam tracking target as a dynamically selected target by selecting beam based on a predicted reference signal. The decision of dynamically selected beam is moderated based on the predicted signal by appropriating adaptive filtering for selecting the beam. The statistical variations are tracked within each selected beam as a part of the adaptive filtering.

Embodiments provide a method for beam tracking in a user equipment (UE), the UE configured to communicate using mmWave in a 5G New Radio (NR) network, the method includes selecting a first beam among a plurality of beams based on a predicted reference signal, perform adaptive filtering on the first beam, and tracking statistical variations in the first beam based on the adaptive filtering.

Embodiments provide a User Equipment (UE) for beam tracking in a 5G New Radio (NR) network using mmWave, the UE including a transceiver, and processing circuitry configured to select a first beam among a plurality of beams based on a predicted reference signal, perform adaptive filtering on the first beam, and track statistical variations in the first beam based on the adaptive filtering.

Embodiments provide non-transitory computer-readable medium storing instructions that, when executed by at least one processor of a User Equipment (UE), cause the at least one processor to select a first beam among a plurality of beams based on a predicted reference signal, perform adaptive filtering on the first beam, and track statistical variations in the first beam based on the adaptive filtering.

To further clarify the advantages and features of the inventive concepts, a more particular description will be rendered by reference to embodiments thereof, which is illustrated in the appended drawings. It is appreciated that these drawings depict embodiments of the inventive concepts and are therefore not to be considered limiting of its scope. The inventive concepts will be described and explained with additional specificity and detail with the accompanying drawings.

BRIEF DESCRIPTION OF THE DRAWINGS

These and other features, aspects, and advantages of the inventive concepts will become better understood when the following detailed description is read with reference to the accompanying drawings in which like characters represent like parts throughout the drawings, wherein.

Further, skilled artisans will appreciate that elements in the drawings are illustrated for simplicity and may not have been necessarily been drawn to scale. For example, the flow charts illustrate the method in terms of the most prominent operations involved to help to improve understanding of aspects of embodiments. Furthermore, in terms of the construction of the device, one or more components of the device may have been represented in the drawings by conventional symbols, and the drawings may show only those specific details that are pertinent to understanding embodiments so as not to obscure the drawings with details that will be readily apparent to those of ordinary skill in the art having benefit of the description herein.

DETAILED DESCRIPTION

To promote an understanding of the principles of the inventive concepts, reference will now be made to embodiments illustrated in the drawings and specific language will be used to describe the same. It will nevertheless be understood that no limitation of the scope of the inventive concepts is thereby intended, such alterations and further modifications in the illustrated system, and such further applications of the principles of embodiments as illustrated therein being contemplated as would normally occur to one skilled in the art to which the inventive concepts relate.

Unless otherwise defined, all technical and scientific terms used herein have the same meaning as, or a similar meaning to, that commonly understood by one of ordinary skilled in the art to which the inventive concepts belong. The system, methods, and examples provided herein are illustrative only and not intended to be limiting.

For example, the term "some" as used herein may be understood as "none" or "one" or "more than one" or "all." Therefore, the terms "none," "one," "more than one," "more than one, but not all" or "all" would fall under the definition of "some." It should be appreciated by a person skilled in the art that the terminology and structure employed herein is for describing, teaching and illuminating embodiments and their specific features and elements and therefore, should not be construed to limit, restrict or reduce the spirit and scope of the claims or their equivalents in any way.

For example, any terms used herein such as, "includes," "comprises," "has," "consists," and similar grammatical variants do not specify an exact limitation or restriction, and certainly do not exclude the possible addition of one or more features or elements, unless otherwise stated. Further, such terms must not be taken to exclude the possible removal of one or more of the listed features and elements, unless otherwise stated, for example, by using the limiting language including, but not limited to, "must comprise" or "needs to include."

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . ." or "one or more element is required."

Unless otherwise defined, all terms and especially any technical and/or scientific terms, used herein may be taken to have the same meaning as, or a similar meaning to, that commonly understood by a person ordinarily skilled in the art.

Reference is made herein to "embodiments." It should be understood that embodiments are examples of a possible implementations of any features and/or elements presented in the attached claims. Embodiments have been described for explaining one or more of the potential ways in which the specific features and/or elements of the attached claims provide uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of embodiments and therefore should not necessarily be taken as limiting factors to the attached claims. The attached claims and their legal equivalents may be realized in the context of embodiments other than the ones used as illustrative examples in the description below.

Embodiments will be described below in detail with reference to the accompanying drawings.

Figure 1A:
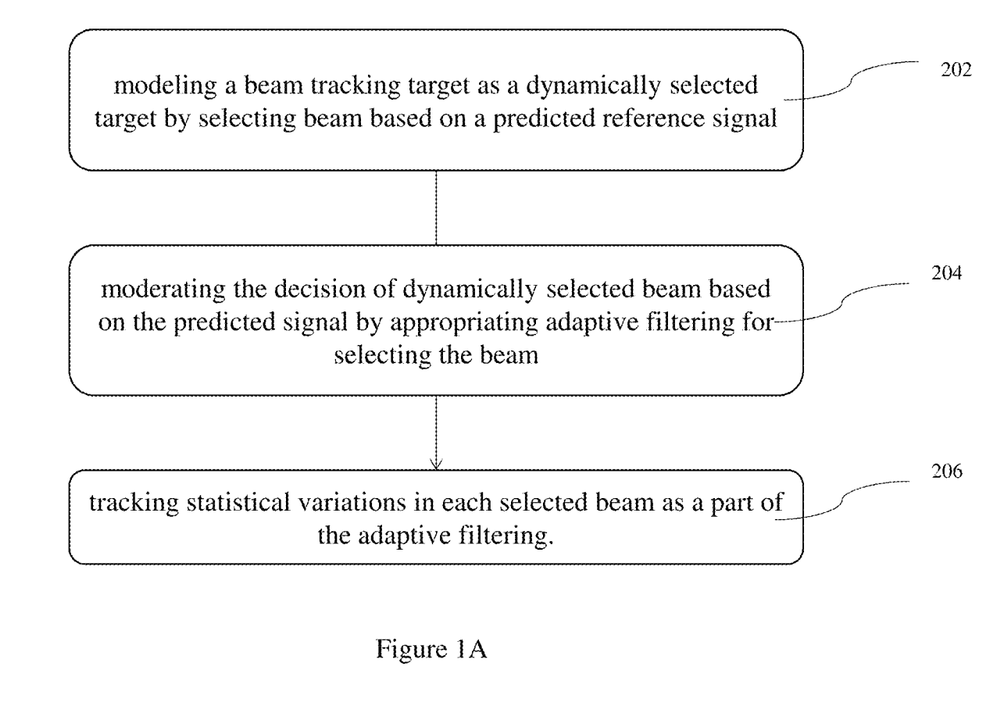
FIG. 1A illustrates a method of operation, in accordance with embodiments of the present subject matter.

FIG. 1A illustrates a method for beam tracking in a 5G network (5G New Radio (NR) mmWave UE). The method may comprise initiating a slot operation defined by 'n' number of plurality of slots, and initializing a plurality of parameters associated with the slot 'n'. Different SSBs are transmitted over multiple slots. Thus, a particular slot corresponding to the SSB with best predicted RSRP will be initialized to receive and measure the actual RSRP. To receive a particular SSB, the corresponding index and associated RF parameters need to be initialized (Ex: Gain/AGC) for that particular slot. The UE may be fixed or mobile and may refer to any device that may communicate with a base station to transmit and receive data and/or control information. For example, the UE may be referred to as a terminal, a terminal equipment, a mobile station (MS), a mobile terminal (MT), a user terminal (UT), a subscriber station (SS), a wireless device, a handheld device, etc. According to embodiments, the UE may include at least one processor (also referred to herein in the singular "processor"), a memory and/or a transceiver. The transceiver may be configured to receive a Synchronization Signal Block (SSB), and/or transmit and receive communication signals, via a beam. Operations performed by the UE may be performed by the processor executing corresponding instructions stored in the memory. The beam may be transmitted by and/or to another device, e.g., another UE and/or a base station. The base station may generally refer to a fixed station that communicates with user equipment and/or other base stations, and may exchange data and control information by communicating with user equipment and/or other base stations. For example, the base station may also be referred to as a Node B, an evolved-Node B (eNB), a next generation Node B (gNB), a sector, a site, a base transceiver system (BTS), an access point (AP), a relay node, a remote radio head (RRH), a radio unit (RU), a small cell, etc. In the present specification, a base station or a cell may be interpreted in a comprehensive sense to indicate some area or function covered by a base station controller (BSC) in CDMA, a Node-B in WCDMA, an eNB in LTE, a gNB or sector (site) in 5G, etc., and may cover all the various coverage areas such as megacell, macrocell, microcell, picocell, femtocell and relay node, RRH, RU, and/or small cell communication range. The base station may communicate with the UE via a wireless communication network (e.g., a 5G NR network). For example, in the wireless communication network, information may be transmitted in various multiple access schemes, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, and OFDM-CDMA.

Thereafter, a beam tracking target may be modeled (202) as a dynamically selected target by selecting beam based on a predicted reference signal. The predicted reference signal may correspond to a received power (RSRP) signal defining at-least one tuning parameter. RSRP corresponds to a received signal power corresponding to the specified reference signal. As may be understood, RSRP does not define the tuning parameter. Tuning parameters are predefined to adjust the time required to reduce the variance between predicted and actual RSRP. These tuning parameters can be function of RF board and can be derived during the calibration. The modeling of the beam-tracking target may comprise computing the predicted signal power RSRP based on the initialization, and choosing the beam with a maximum (or highest) predicted signal power RSRP. The selecting of the beam may comprise scheduling the selected beam (A) (e.g., to obtain a scheduled time and/or frequency for communicating with the base station) and receiving a Synchronization Signal Block (SSB) RSRP Ri. The SSB RSRP Ri may correspond to a received signal power corresponding to a synchronization signal or a specified reference signal. As far as significance/role of SSB RSRP is concerned, the same may be understood from forthcoming paragraph. In general, SSB SINR can also be used instead of RSRP.

In an example, Predicted RSRP is calculated for all the configured beams. But, the actual RSRP is calculated for the selected beam. The difference or variance will further ensure that predicted RSRP improves for the selected beam or degrades in which case a different beam will be selected. This dynamic selection helps in beam tracking more effectively. The variance of actual RSRP to predicted RSRP will be small if the UE is not moving the corresponding SSB remain same. In case of mobility, the variance will increase if SSB RSRP degrades and the algorithm will help in selecting the next best SSB and thus maintaining optimal performance. Here, 'n' refers a particular time slot on the air interface where SSB is present.

According to embodiments, the UE may receive the SSB RSRP Ri via the selected beam (A), and/or may schedule the selected beam (A) according to the received SSB. According to embodiments, the UE may generate a signal (e.g., a communication signal), and may transmit the signal according to the scheduled time and/or frequency via the selected beam (A). According to embodiments, the UE may receive a signal (e.g., a communication signal) via the beam according to the scheduled time and/or frequency.

Further, the method may comprise moderating (204) the decision of dynamically selected beam based on the predicted signal by appropriating adaptive filtering for selecting the beam. Thereafter, the method may comprise tracking (206) statistical variations in each selected beam as a part of the adaptive filtering.

The tracking of statistical-variations may comprise tracking mean and variance in each selected beam as a part of the adaptive filtering. More specifically, the tracking of the statistical variations in each selected-beam may comprise updating a filter-gain vector based on the selected-beam and the maximum (or highest) predicted signal power; and thereafter filtering the predicted signal power and a corresponding variance vector. As later explain in paragraphs 56 and 57 and based on later depicted Equations 1-7, UE filters predicted signal power/RSRP and its relations to remaining features of claims.

Figure 1B:
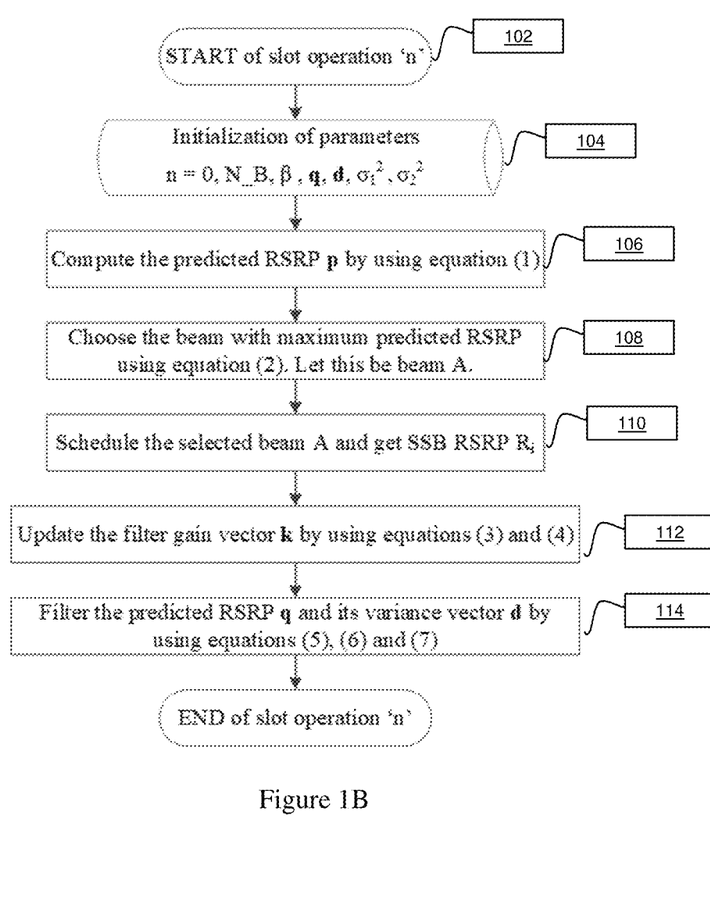
FIG. 1B illustrates a flow diagram depicting a method for beam tracking in a 5G New Radio (NR) mmWave UE, in accordance with embodiments of the present subject matter.

FIG. 1B illustrates a flow diagram depicting a method for beam tracking in a 5G New Radio (NR) mmWave UE, in accordance with embodiments of the present subject matter.

At operation 102, the method may include starting slot operation 'n'.

At operation 104, the method may include initialization of parameters n=0, N_B, β, q, d, $\sigma_1^2$, $\sigma_2^2$.

At operation 106, the method may include computing the predicted RSRP p by using the equation 1 (as shown below).

At operation 108, the method may include choosing the beam with maximum (or highest) predicted RSRP using an equation 2 (as shown below). In embodiments the beam (e.g., the selected beam) is beam (A).

At operation 110, the method may include scheduling the selected beam (A) and getting Synchronization Signal Block (SSB) RSRP $R_i$. According to embodiments, the UE may schedule a timing for receiving the SSB RSRP $R_i$, and may receive the SSB RSRP $R_i$ at the scheduled timing.

At operation 112, the method may include updating the filter gain vector k by using an equation 2 and an equation 4 (as shown below).

At operation 114, the method may include filtering the predicted RSRP p and corresponding variance vector d by equations 5, 6 and 7 (as shown below).

According to embodiments, the method includes beam tracking based on dynamic choice selection with adaptive filtering. For each SSB slot (n) the beam tracking algorithm illustrated in the present subject matter runs to find the best (e.g., strongest signal) Serving Rx Beam corresponding to the Serving SSB. The method includes computation of predicted RSRP (p) for all Rx Beams ($N_B$) based on filtered RSRP (q) for slot n. The method includes choosing a beam with predicted RSRP out of $N_B$ beams. The method includes scheduling the beam and getting the serving SSB RSRP with selected Rx Beam. The method includes updating the filter gain ($k_A$) for beam (A) based on filtered RSRP variance ($d_A$). The method further includes calculating filtered RSRP (q) and filtered RSRP variance (d) for slot (n+1).

Equation used in the above described method illustrated in FIG. 1B are mentioned below:

$$p = q(n) + \beta\sqrt{q(n) + \sigma_1^2 1} \quad \text{(equation 1)}$$

$$A = \arg\max_{i \in [0, N_B - 1]} p \quad \text{(equation 2)}$$

$$k_{N_B \times 1} = \begin{bmatrix} k_0 \\ k_1 \\ \vdots \\ \vdots \\ k_{N_B-1} \end{bmatrix} = \begin{bmatrix} 0 \\ 0 \\ \vdots \\ \vdots \\ 0 \end{bmatrix} \quad \text{(equation 3)}$$

$$k_A = (d_A + \sigma_1^2)/(d_A + \sigma_1^2 + \sigma_2^2) \quad \text{(equation 4)}$$

$$r_{N_B \times 1} = R_i 1_{N_B \times 1} \quad \text{(equation 5)}$$

$$q(n+1) = q(n) + k^T(r - q(n)) \quad \text{(equation 6)}$$

$$d(n+1) = (1-k)^T(d(n) + \sigma_1^2 1) \quad \text{(equation 7)}$$

where,
n: time instant
p: Predicted RSRP vector of size $N_B \times 1$
q: Filtered RSRP vector of size $N_B \times 1$
d: Predicted RSRP variance vector of size $N_B \times 1$
k: Filtered gain vector of size $N_B \times 1$
$k_A$: Denotes gain at index A in vector k
$\sigma_1^2$: Variance of RSRP measure from cell searches
$\sigma_2^2$: Variance of mean of RSRP measure from cell searches
$\sigma_1^2 = \sigma_2^2$: Makes no difference to algorithm The beam tracking is based on dynamic choice selection with adaptive filtering. For each SSB slot (n) the beam tracking algorithm illustrated in the present subject matter runs to find the best Serving Rx Beam corresponding to the serving SSB. Computation of predicted RSRP (p) for all Rx Beams ($N_B$) is based on filtered RSRP (q) for slot n using the equation 1.

In an example, Predicted RSRP is calculated for all the configured beams. But, the actual RSRP is calculated for the selected beam. The difference or variance will further ensure that predicted RSRP improves for the selected beam or degrades in which case a different beam will be selected. This dynamic selection helps in beam tracking more effectively. The variance of actual RSRP to predicted RSRP will be small if the UE is not moving the corresponding SSB remain same. In case of mobility, the variance will increase if SSB RSRP degrades and the algorithm will help in selecting the next best SSB and thus maintaining optimal performance. Here, 'n' refers a particular time slot on the air interface where SSB is present.

Figure 2A:
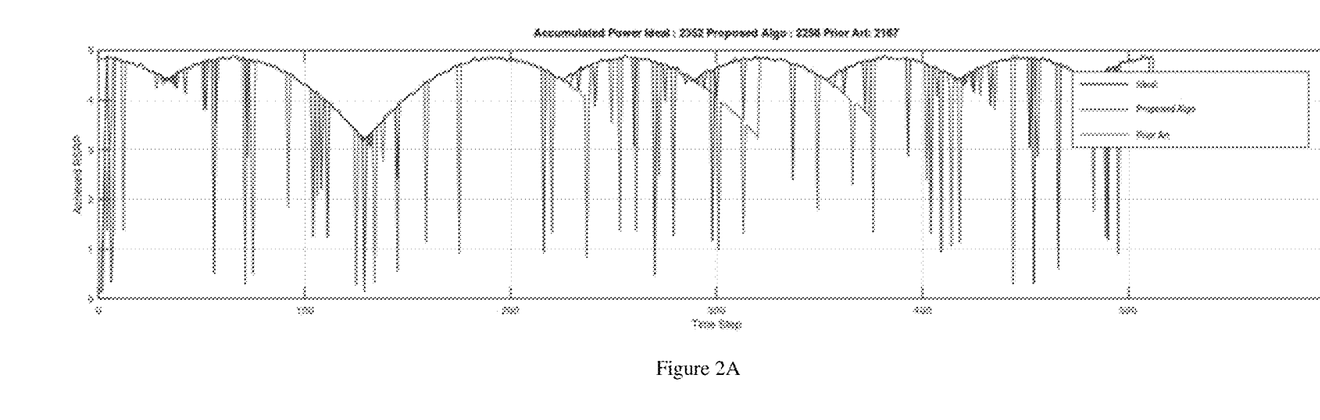
FIG. 2A illustrates a graphical representation depicting accumulated power for achieved RSRP.

Adaptive filtering helps in improving the accuracy of predicted RSRP over multiple iterations and to select the best beam quickly. This is done by measuring the actual RSRP on the selected beam and then filtering it by using a filter gain k. The process is adaptive because the filter gain itself gets updated in the next iteration. This procedure happens for all the beams. In the equation Ri is the measured RSRP in the selected beam and r is the vector form of it where the index corresponding to selected beam will contain Ri FIG. 2A illustrates a graphical representation depicting accumulated power for achieved RSRP. The graphical representation includes accumulated power for an ideal scenario, a proposed algorithm in the present subject matter, and a prior art.

Figure 2B:
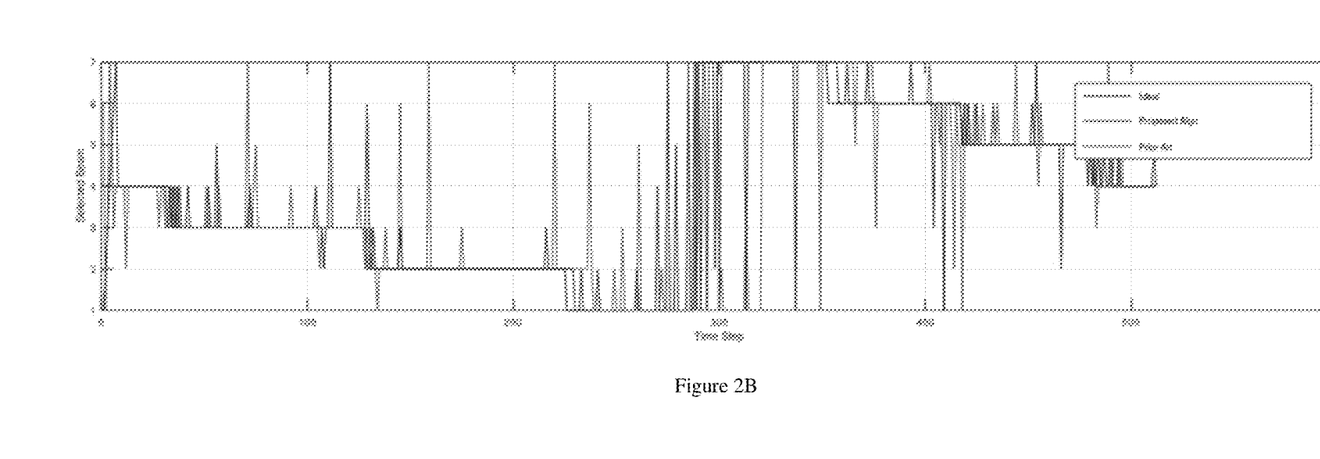
FIG. 2B illustrates a graphical representation depicting accumulated power for a selected beam.

FIG. 2B illustrates a graphical representation \depicting accumulated power for a selected beam. The graphical representation includes accumulated power for an ideal scenario, a proposed algorithm in the present subject matter, and a prior art.

Figure 3:
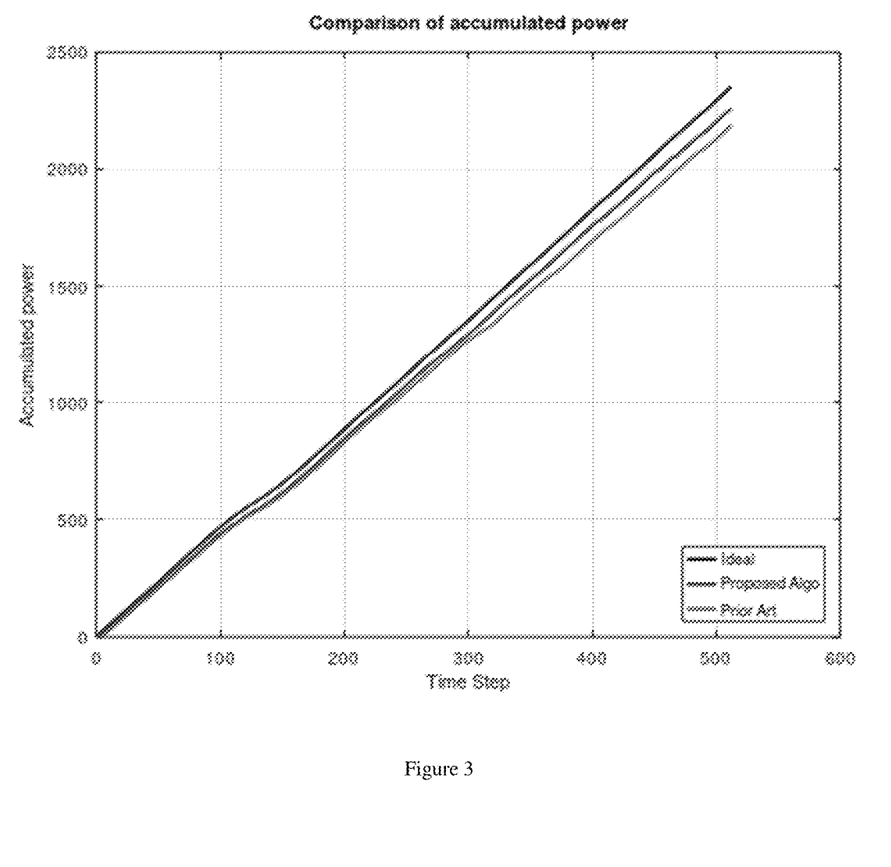
FIG. 3 illustrates a graphical representation depicting a comparison between accumulated powers for an ideal scenario, a proposed algorithm in the present subject matter, and the prior art.

FIG. 3 illustrates a graphical representation depicting a comparison between accumulated powers for an ideal scenario, a proposed algorithm in the present subject matter, and a prior art.

Figure 4:
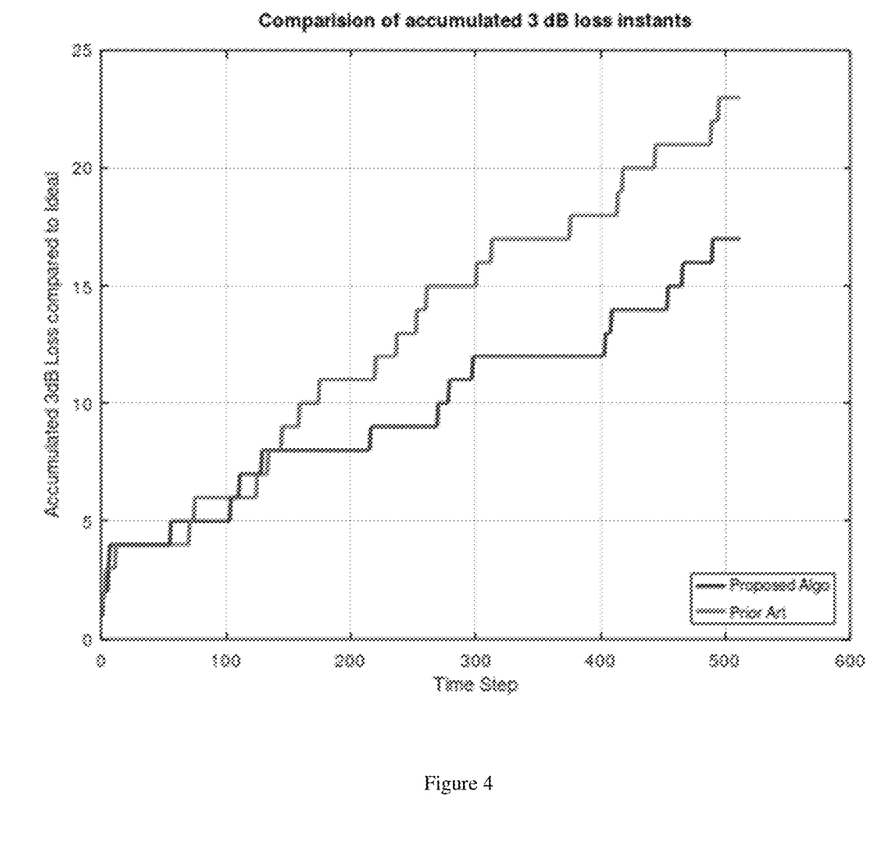
FIG. 4 illustrates a graphical representation depicting a comparison of accumulated 3 dB loss instants for the ideal scenario, the proposed algorithm in the present subject matter, and the prior art.

FIG. 4 illustrates a graphical representation \depicting a comparison of accumulated 3 dB loss instants for an ideal scenario, a proposed algorithm in the present subject matter, and a prior art.

In embodiments, the present subject matter includes a number of advantages mentioned below:

As observed from FIGS. 2A and 2B, at a 15 dB Signal-to-Noise Ratio (SNR), selection of Serving Rx Beam based on Proposed algorithm is better than prior art. More than 87% times Serving Rx Beam provided by proposed algorithm matches ideal scenario, in the prior art Serving Rx Beam is correctly determined for 79% of times.

At a lower SNR level of 10 dB, performance of proposed beam tracking algorithm is better. Proposed algorithm correctly determines Serving Rx Beam for 85.5% of times whereas in case of prior art Serving Rx Beam matches ideal scenario for 69.8% times.

As illustrated in FIG. 3, over a long run, accumulated power of Serving SSB corresponding to Serving Rx Beam is close to ideal as per the proposed algorithm.

A more suitable measure of performance of beam tracking algorithms is a count of the number of instances with a 3 dB loss of power. As observed from FIG. 4, the count is significantly lower for the proposed beam tracking algorithm.

Conventional devices perform beam tracking according to a round robin technique or by referring to a LUT. Such devices experience lengthy delays in measuring the signal strength of each combination of SSB (e.g., for a Tx beam and Rx beam). Due to this delay, the conventional devices are unable to adequately track a desired beam resulting in loss of connection with another device (e.g., a base station). In LUT or round robin based, each SSB is measured multiple times during their reception by using different receive beams to decide if best receive beam needs to be changed. This will take more time for beam tracking and may not be efficient in a mobile environment. The benefit of the present subject matter is that only one receive beam is selected for the actual measurement based on the variance and predicted RSRP. This reduces the time to measure and beam tracking is faster. It will also adapt easily to a mobile or non-stationary environment.

However, according to embodiments, improved devices are provided for beam tracking. For example, the improved devices select the desired beam based on a predicted RSRP. Accordingly, the improved devices do not experience the lengthy delays of the conventional devices. Thus, the improved devices overcome the deficiencies of the conventional devices to adequately track the desired beam, thereby improving the reliability of the connection with the other device.

According to embodiments, operations of the methods described herein (e.g., the methods described in association with FIGS. 1A and 1B), such as those described as being performed by the UE, may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Figure 5:
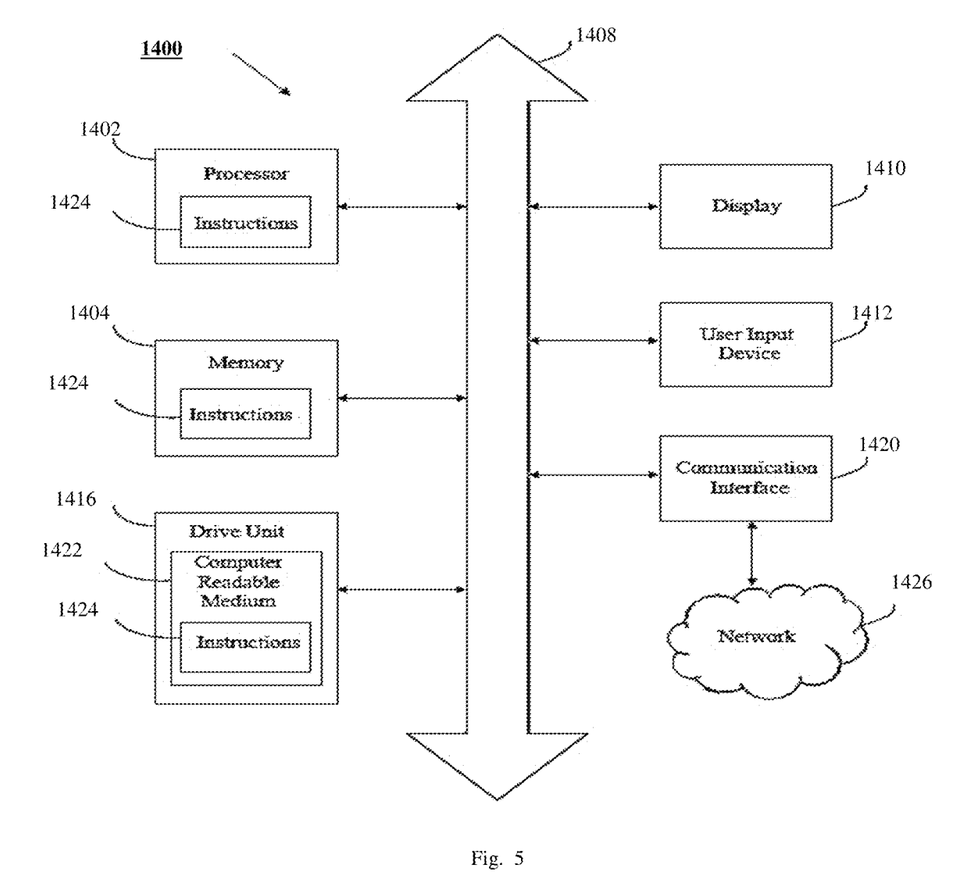
FIG. 5 illustrates an implementation of the system as illustrated in FIG. 1 till 4 in a computing environment.

FIG. 5 illustrates an implementation of the system as illustrated in FIG. 1 till 4 in a computing environment. Such computing environment may be any modem which uses predefined set of Receive beam (for example stored in NV-RAM). The present figure essentially illustrates the hardware configuration of the system. The computer system 1400 can include a set of instructions that can be executed to cause the computer system 1400 to perform any one or more of the methods disclosed. The computer system 1400 may operate as a standalone device or may be connected, e.g., using a network, to other computer-systems or peripheral devices.

In a networked deployment, the computer system 1400 may operate in the capacity of a server or as a client user computer in a server-client user network environment, or as a peer computer system in a peer-to-peer (or distributed) network environment. The computer system 1400 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1400 is illustrated, the term "system" shall also be taken to include any collection of systems or sub-systems that individually or jointly execute a set, or multiple sets, of instructions to perform one or more computer functions.

The computer system 1400 may include a processor 1402 (e.g., a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analyzing and processing data The processor 1402 may implement a software program, such as code generated manually (i.e., programmed).

The computer system 1400 may include a memory 1404, such as a memory 1404 that can communicate via a bus 1408. The memory 1404 may be a main memory, a static memory, or a dynamic memory. The memory 1404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1404 includes a cache or random access memory for the processor 1402. In alternative examples, the memory 1404 is separate from the processor 1402, such as a cache memory of a processor, the system memory, or other memory. The memory 1404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1404 is operable to store instructions executable by the processor 1402. The functions, acts or tasks illustrated in the figures or described may be performed by the programmed processor 1402 executing the instructions stored in the memory 1404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1400 may or may not further include a display unit 1410, such as a liquid crystal display (LCD), an organic light emitting diode (OLED), a flat panel display, a solid state display, a cathode ray tube (CRT), a projector, a printer or other now known or later developed display device for outputting determined information. The display 1410 may act as an interface for the user to see the functioning of the processor 1402, or specifically as an interface with the software stored in the memory 1404 or in the drive unit 1416.

Additionally, the computer system 1400 may include an input device 1412 configured to allow a user to interact with any of the components of system 1400. The input device 1412 may be a number pad, a keyboard, or a cursor control device, such as a mouse, or a joystick, touch screen display, remote control or any other device operative to interact with the computer system 1400.

The computer system 1400 may also include a disk or optical drive unit 1416. The disk drive unit 1416 may include a computer-readable medium 1422 in which one or more sets of instructions 1424, e.g. software, can be embedded. Further, the instructions 1424 may embody one or more of the methods or logic as described. In a particular example, the instructions 1424 may reside completely, or at least partially, within the memory 1404 or within the processor 1402 during execution by the computer system 1400. The memory 1404 and the processor 1402 also may include computer-readable media as discussed above.

The present invention contemplates a computer-readable medium that includes instructions 1424 or receives and executes instructions 1424 responsive to a propagated signal so that a device connected to a network 1426 can communicate voice, video, audio, images or any other data over the network 1426. Further, the instructions 1424 may be transmitted or received over the network 1426 via a communication port or interface 1420 or using a bus 1408. The communication port or interface 1420 may be a part of the processor 1402 or may be a separate component. The communication port 1420 may be created in software or may be a physical connection in hardware. The communication port 1420 may be configured to connect with a network 1426, external media, the display 1410, or any other components in system 1400 or combinations thereof. The connection with the network 1426 may be a physical connection, such as a wired Ethernet connection or may be established wirelessly as discussed later. Likewise, the additional connections with other components of the system 1400 may be physical connections or may be established wirelessly. The network 1426 may alternatively be directly connected to the bus 1408.

The network 1426 may include wired networks, wireless networks, Ethernet AVB networks, or combinations thereof. The wireless network may be a cellular telephone network, an 802.11, 802.16, 802.20, 802.1Q or WiMax network. Further, the network 1426 may be a public network, such as the Internet, a private network, such as an intranet, or combinations thereof, and may utilize a variety of networking protocols now available or later developed including, but not limited to TCP/IP based networking protocols.

In an alternative example, dedicated hardware implementations, such as application specific integrated circuits, programmable logic arrays and other hardware devices, can be constructed to implement various parts of the system 1400.

While specific language has been used to describe the present subject matter, any limitations arising on account thereto, are not intended. As would be apparent to a person in the art, various working modifications may be made to the method in order to implement the inventive concepts as taught herein. The drawings and the foregoing description give examples of embodiments. Those skilled in the art will appreciate that one or more of the described elements may well be combined into a single functional element. Alternatively, certain elements may be split into multiple functional elements. Elements from embodiments may be combined.

We claim:

1. A method for beam tracking in a user equipment (UE), the UE configured to communicate using mmWave in a 5G New Radio (NR) network, the method comprising:
   selecting a first beam among a plurality of beams based on a predicted received signal power of a first signal, the first signal being a synchronization signal or a reference signal, the predicted received signal power being based on first statistical variations in the first beam, the first statistical variations corresponding to a first slot, the predicted received signal power corresponding to a second slot, and the first slot preceding the second slot;
   performing adaptive filtering on the first beam; and
   tracking second statistical variations in the first beam based on the adaptive filtering.

2. The method as claimed in claim 1, wherein the second statistical variations comprise at least one of a mean or a variance of the first beam.

3. The method as claimed in claim 1, further comprising:
   initiating a slot operation defined by a plurality of slots; and
   initializing a plurality of parameters associated with at least one of the plurality of slots.

4. The method as claimed in claim 3, wherein the selecting the first beam comprises:
   computing a predicted received signal power for each of the plurality of beams based on the plurality of parameters; and
   choosing the first beam with a highest predicted received signal power among the plurality of beams.

5. The method as claimed in claim 1, further comprising:
   scheduling the first beam; and
   receiving a Synchronization Signal Block (SSB) RSRP, the SSB RSRP corresponding to the first signal.

6. The method as claimed in claim 5, wherein the tracking the second statistical variations comprises:
   updating a filter gain based on the first beam and a highest predicted received signal power; and
   filtering a predicted received signal power and a corresponding variance associated with a third slot, the second slot preceding the third slot.

7. The method as claimed in claim 1, further comprising:
   determining a schedule corresponding to the first beam based on a SSB;
   generating a communication signal; and
   transmitting the communication signal via the first beam according to the schedule.

8. A User Equipment (UE) for beam tracking in a 5G New Radio (NR) network using mmWave, the UE comprising:
   a transceiver; and
   processing circuitry configured to, select a first beam among a plurality of beams based on a predicted received signal power of a first signal, the first signal being a synchronization signal or a reference signal, the predicted received signal power being based on first statistical variations in the first beam, the first statistical variations corresponding to a first slot, the predicted received signal power corresponding to a second slot, and the first slot preceding the second slot, perform adaptive filtering on the first beam, and track second statistical variations in the first beam based on the adaptive filtering.

9. The UE as claimed in claim 8, wherein the second statistical variations comprise at least one of a mean or a variance of the first beam.

10. The UE as claimed in claim 8, wherein the processing circuitry is configured to:

initiate a slot operation defined by a plurality of slots; and initialize a plurality of parameters associated with at least one of the plurality of slots.

11. The UE as claimed in claim 10, wherein the processing circuitry is configured to select the first beam by:

computing a predicted received signal power for each of the plurality of beams based on the plurality of parameters; and choosing the first beam with a highest predicted received signal power among the plurality of beams.

12. The UE as claimed in claim 8, wherein the processing circuitry is configured to:

schedule the first beam; and receive a Synchronization Signal Block (SSB) RSRP, the SSB RSRP corresponding to the first signal.

13. The UE as claimed in claim 12, wherein the processing circuitry is configured to track the second statistical variations by:

updating a filter gain based on the first beam and a highest predicted received signal power; and filtering a predicted received signal power and a corresponding variance associated with a third slot, the second slot preceding the third slot.

14. The UE as claimed in claim 8, wherein the processing circuitry is configured to:

determine a schedule corresponding to the first beam based on a SSB;

generate a communication signal; and transmit the communication signal via the first beam according to the schedule.

15. A non-transitory computer-readable medium storing instructions that, when executed by at least one processor of a User Equipment (UE), cause the at least one processor to:

select a first beam among a plurality of beams based on a predicted received signal power of a first signal, the first signal being a synchronization signal or a reference signal, the predicted received signal power being based on first statistical variations in the first beam, the first statistical variations corresponding to a first slot, the predicted received signal power corresponding to a second slot, and the first slot preceding the second slot;

perform adaptive filtering on the first beam; and track second statistical variations in the first beam based on the adaptive filtering.

16. The non-transitory computer-readable medium as claimed in claim 15, wherein the second statistical variations comprise at least one of a mean or a variance of the first beam.

17. The non-transitory computer-readable medium as claimed in claim 15, wherein the instructions, when executed by the at least one processor, cause the at least one processor to:

determine a schedule corresponding to the first beam based on a SSB;

generate a communication signal; and transmit the communication signal via the first beam according to the schedule.

18. The non-transitory computer-readable medium as claimed in claim 15, wherein the instructions, when executed by the at least one processor, cause the at least one processor to:

initiate a slot operation defined by a plurality of slots; and initialize a plurality of parameters associated with at least one of the plurality of slots.

19. The non-transitory computer-readable medium as claimed in claim 18, wherein the instructions, when executed by the at least one processor, cause the at least one processor to select the first beam by:

computing a predicted received signal power for each of the plurality of beams based on the plurality of parameters; and choosing the first beam with a highest predicted received signal power among the plurality of beams.

20. The non-transitory computer-readable medium as claimed in claim 15, wherein the instructions, when executed by the at least one processor, cause the at least one processor to:

schedule the first beam; and receive a Synchronization Signal Block (SSB) RSRP, the SSB RSRP corresponding to the first signal.

* * * * *